(12) United States Patent
Mukunoki et al.

(10) Patent No.: US 8,250,978 B2
(45) Date of Patent: Aug. 28, 2012

(54) SEMICONDUCTOR BRIDGE, IGNITER, AND GAS GENERATOR

(75) Inventors: Hirotaka Mukunoki, Himeji (JP); Shigeru Maeda, Himeji (JP); Hiroki Taguchi, Himeji (JP)

(73) Assignee: Nippon Kayaku Kabushiki Kaisha, Tokyo (JP)

(*) Notice: Subject to any disclaimer, the term of this patent is extended or adjusted under 35 U.S.C. 154(b) by 0 days.

(21) Appl. No.: 12/066,163

(22) PCT Filed: Sep. 5, 2006

(86) PCT No.: PCT/JP2006/317524
§ 371 (c)(1),
(2), (4) Date: Mar. 7, 2008

(87) PCT Pub. No.: WO2007/029682
PCT Pub. Date: Mar. 15, 2007

(65) Prior Publication Data
US 2009/0126592 A1     May 21, 2009

(30) Foreign Application Priority Data

Sep. 7, 2005  (JP) .................. 2005-258631
Jan. 18, 2006  (JP) .................. 2006-010184

(51) Int. Cl.
*F42B 3/13* (2006.01)
(52) U.S. Cl. .................. 102/202.7
(58) Field of Classification Search ......... 102/202.7, 102/202.5, 202.8, 202.9, 202.6, 200
See application file for complete search history.

(56) References Cited

U.S. PATENT DOCUMENTS 3,571,914 A * 3/1971 Lands et al. .................. 438/143
4,976,200 A * 12/1990 Benson et al. ............. 102/202.7
5,099,762 A    3/1992 Drapala
5,309,841 A * 5/1994 Hartman et al. ........... 102/202.4
(Continued)

FOREIGN PATENT DOCUMENTS

CN     1616915 A     5/2005
(Continued)

OTHER PUBLICATIONS

Notice of Reasons for Rejection issued Jun. 21, 2011 in Japanese Patent Application No. 2007-534420 (with English translation).

(Continued)

*Primary Examiner* — Michael Carone
*Assistant Examiner* — Reginald Tillman, Jr.
(74) *Attorney, Agent, or Firm* — Oblon, Spivak, McClelland, Maier & Neustadt, L.L.P.

(57) ABSTRACT

The invention provides a semiconductor bridge, an igniter, and a gas generator each of which satisfies a high-speed responsiveness required of, for example, an automotive side inflator. The semiconductor bridge includes a bridge part heated by being supplied with a current. The bridge part is disposed on a substrate. The bridge part includes a first layer and an ignition bridge layer. The first layer is formed on the substrate and has insulating properties. The ignition bridge layer serves as a second layer disposed on the first layer. The width of the bridge part at the first layer and the width of the bridge part at the second layer are substantially equal to each other. A space is provided around the bridge part. With this structure, the diffusion of current and heat into the substrate can be restricted to the minimum level, and the ignition time can be quickened as an ignition characteristic. Each of the igniter and the gas generator includes the semiconductor bridge.

11 Claims, 9 Drawing Sheets

U.S. PATENT DOCUMENTS

| | | | |
|---|---|---|---|
| 6,199,484 B1 * | 3/2001 | Martinez-Tovar et al. | 102/202.4 |
| 6,408,758 B1 * | 6/2002 | Duguet | 102/202.2 |
| 6,470,802 B1 * | 10/2002 | Neyer et al. | 102/202.5 |
| 6,772,692 B2 * | 8/2004 | Baginski et al. | 102/202.7 |
| 6,810,815 B2 * | 11/2004 | Mueller-Fiedler et al. | 102/202.5 |
| 6,986,307 B2 * | 1/2006 | Bernhard et al. | 102/202.7 |
| 7,748,323 B2 * | 7/2010 | Maeda et al. | 102/202.7 |
| 2003/0164106 A1 * | 9/2003 | Mueller-Fiedler et al. | 102/205 |
| 2004/0134371 A1 * | 7/2004 | Bernhard et al. | 102/202.7 |
| 2007/0056459 A1 * | 3/2007 | Martinez-Tovar et al. | 102/202.7 |
| 2009/0126592 A1 * | 5/2009 | Mukunoki et al. | 102/202.7 |

FOREIGN PATENT DOCUMENTS

| | | |
|---|---|---|
| EP | 1 113 241 A1 | 7/2001 |
| JP | 7-61319 | 3/1995 |
| JP | 7 92358 | 10/1995 |
| JP | 2000-28298 | 1/2000 |
| JP | 2001 505646 | 4/2001 |
| JP | 2004 518939 | 6/2004 |
| JP | 2004 239572 | 8/2004 |
| JP | 2005 140477 | 6/2005 |
| WO | WO 98/39615 | 9/1998 |

OTHER PUBLICATIONS

Extended European Search Report mailed Oct. 14, 2011 for EP 06797430, filed Sep. 5, 2006.

* cited by examiner

SEMICONDUCTOR BRIDGE, IGNITER, AND GAS GENERATOR

TECHNICAL FIELD

The present invention relates to a semiconductor bridge that is an ignition element of an igniter used in a gas generator of, for example, an airbag system of an automotive, and relates to an igniter and a gas generator each of which includes the semiconductor bridge.

BACKGROUND ART

Generally, an igniter is used to start an exothermic reaction, such as combustion, deflagration, or detonation. For example, an igniter is widely used to start inflating an air bag of an automotive or to start firing industrial explosives.

The igniter includes a bridge part that generates heat by being energized, an ignition compound ignited by this heat generation, and electrode pins used to energize the bridge part. To ignite the ignition compound, a conventional igniter has used a bridge wire as the bridge part. The bridge wire is a thin wire that has electric resistance and that is disposed between two contact points. The ignition compound surrounds the bridge wire, and is ignited by ohmic heating when the bridge wire is supplied with an electric current.

The conventional igniter provided with the bridge wire uses a nichrome wire as the bridge wire. If the wire diameter of the bridge wire is extremely small, this bridge wire cannot be provided in the igniter. If the wire diameter of the bridge wire is large enough to be provided in the igniter, this bridge wire has a great thermal capacity, and hence time from the bridge wire is energized till the bridge wire reaches an ignition temperature will become long. Therefore, for example, a high-speed responsiveness required for an automotive side inflator is not satisfied.

The term "semiconductor bridge" is a general term for bridges produced by semiconductor technology, such as evaporation. The structure of the semiconductor bridge is made up of two electrode pads each of which serves as an electric contact point, two electrode parts disposed under the electrode pads, and a bridge part through which the two electrode parts are connected together, which is ignited by being energized, and which is thinner than the electrode parts. The semiconductor bridge used in the igniter is a thinner film bridge whose thickness is about several microns than the bridge wire, and hence can make the thermal capacity small, and can give a high-speed responsiveness. The bridge wire allows an ignition compound to be ignited in about 800 to 1000 microseconds, whereas the semiconductor bridge allows an ignition compound to be ignited in about 100 to 200 microseconds in most cases. Therefore, the semiconductor bridge enables high-speed ignition.

An example of such a semiconductor bridge is disclosed by Patent Document 1. The semiconductor bridge disclosed by this document has a heat insulating layer disposed on the whole surface of a base. An electrically-conductive ignition bridge layer that has undergone patterning is disposed on the heat insulating layer, and can be ignited by less energy. In the ignition bridge layer, hydrogenated hafnium or hydrogenated titanium is used as an essential ingredient.
Patent Document 1: Japanese Translation of International Application (Kohyo) No. 2001-505646

DISCLOSURE OF INVENTION

Problems to be Solved by the Invention

In the semiconductor bridge disclosed by Patent Document 1, the oxide film is disposed on the silicon substrate, and is formed so as to uniformly extend on the whole substrate. Therefore, a current applied thereonto and heat generated thereat are uniformly spread over the oxide film, and, as a result, current leakage and heat radiation occur, and hence ignition time cannot be quickened.

Means for Solving the Problems

To solve the problems, the present inventors examined variously, and paid attention to the diffusion of current and heat into the substrate which is caused when the semiconductor bridge is energized and the bridge part is heated. Unlike the technique disclosed by the above-mentioned document in which a heat insulating layer is formed on the whole base, the present inventors formed a two-layer structure including a heat insulating layer as a first layer and an ignition bridge layer as a second layer. The second layer is electrically conductive and consists of two electrode parts and a bridge part by which the two electrode parts are connected together and that is thinner than the electrode part. The first layer has an insulating layer subjected to patterning so as to have the same shape as the second layer disposed on the first layer. The first layer is formed on the base. A space is provided around the bridge part. Alternatively, a side face and an upper face of the bridge part are exposed outwardly. As a result, the present inventors found that this structure makes it possible to prevent the diffusion of current and heat on the substrate, makes it possible to concentrate energy on the bridge part, and makes it possible to more quicken the ignition time than the conventional semiconductor bridge. Therefore, the present inventors provide the semiconductor bridge of the present invention and an igniter and a gas generator each of which includes the thus structured semiconductor bridge.

(1) The present invention provides a semiconductor bridge including a bridge part ignited by applying a current, the bridge part including a first layer formed on a substrate and a second layer formed on the first layer, the first layer having insulating properties, the second layer being made of a resistive material, in which a width of the bridge part at the first layer and a width of the bridge part at the second layer are substantially equal to each other, and provides an igniter and a gas generator each of which includes the thus structured semiconductor bridge. Note that the term "substantially equal in width" mentioned in the present invention denotes that, even if the first layer is enlarged within the range up to 5% based on the width of the second layer, the first and second layers are equal in width to each other.

The first layer is formed to be substantially equal in width to the second layer, and a space is provided around the bridge part. As a result, the diffusion of heat and current can be prevented on the substrate, and hence energy can be effectively concentrated on the bridge part, and the ignition time can be quickened.

(2) According to another aspect, the present invention provides a semiconductor bridge including a bridge part heated by applying a current and formed on a substrate, the bridge part including a first layer and an ignition bridge layer, the first layer being formed on the substrate and having insulating properties, the ignition bridge layer being formed on the first layer and serving as a second layer, in which a width of the bridge part at the first layer and a width of the bridge part at the second layer are substantially equal to each other, and in which a side face and an upper face of the bridge part are exposed outwardly. The present invention additionally provides an igniter and a gas generator each of which includes the thus structured semiconductor bridge. Preferably, in this aspect, the bridge part consists of two layers.

In the structure mentioned in (2), the first layer is formed to be substantially equal in width to the second layer, and the side face and the upper face of the bridge part are exposed outwardly. As a result, the diffusion of heat and current can be prevented on the substrate, and hence energy can be effectively concentrated on the bridge part, and the ignition time can be more quickened than that of (1). Additionally, the semiconductor bridge in which the bridge part consists of the two layers and in which no layer is disposed on the second layer can remove a manufacturing step, and hence can be produced at lower cost than a semiconductor bridge including a bridge part provided with three or more layers.

(3) The term "insulation" or "insulating properties" mentioned in the present invention denotes electrical insulation and thermal insulation. Preferably, the thermal conductivity of the first layer is 50 W/m·K or less, and the electrical resistivity thereof is $10^6$ Ω·m or more. With this structure, a more excellent ignition performance can be shown.

(4) The ignition bridge layer that is the second layer mentioned in the present invention is a layer heated by being energized. Preferably, the second layer consists especially of a Ni—Cr layer containing Ni and Cr. With this structure, the layer can be stably ignited even when the temperature is high or low, because the resistance temperature coefficient is low. Preferably, the first layer consists of a layer containing $SiO_2$. With this structure, adhesion with the substrate can be heightened, and production is facilitated. Preferably, the first layer has a thickness of about 0.02 microns to 3 microns. With this structure, the diffusion of current and heat can be prevented on the substrate at low manufacturing costs. Preferably, the second layer has a thickness of about 0.02 microns to 3 microns. With this structure, the layer can be reliably ignited, and heat generated by a diagnostic current can be avoided. The term "diagnostic current" mentioned here denotes a faint current allowed to always flow through the semiconductor bridge during the operation of a device, such as an engine, so as to discover a failure or disorder in an electrical system.

(5) For example, a silicon-made, a glass-made, or a ceramic-made substrate can be mentioned as the substrate, and, preferably, a silicon-made substrate is used. With this structure, the effect of the present invention of being capable of quickening the ignition time can be more advantageously shown, and the semiconductor bridge can be produced at low cost.

(6) Preferably, in particular, in the semiconductor bridge of the present invention, the substrate is made of silicon, and the surface of the substrate is provided with an oxide film, and the first layer consists of a layer containing $SiO_2$. With this structure, the adhesion between the bridge part and the substrate can be more heightened.

(7) In the igniter of the present invention, the semiconductor bridge is used as an ignition element. With this structure, the ignition time to ignite a gas generating agent can be more quickened.

(8) The gas generator of the present invention includes the igniter mentioned above. With this structure, a safety device, such as an air bag or a seatbelt pretensioner, can be operated in shorter time.

(9) The igniter of the present invention includes a cup body; a plurality of electrode pins; a header with which an opening of the cup body is covered, the header holding the plurality of electrode pins insulated from each other; the semiconductor bridge of (2), the semiconductor bridge being in contact with an ignition compound provided in the cup body, the semiconductor bridge being electrically connected to the electrode pins, the semiconductor bridge being ignited by being supplied with a current from outside through the plurality of electrode pins; and a capacitor electrically connected to a pair of electrode pins among the plurality of electrode pins at the outside of the cup body, the pair of electrode pins being electrically parallel to the semiconductor bridge. With this structure, the igniter can be effectively prevented from being wrongly operated by a static discharge caused by, for example, electromagnetic wave noise from the outside.

(10) The igniter of the present invention includes a cup body; a plurality of electrode pins; a header with which an opening of the cup body is covered, the header holding the plurality of electrode pins insulated from each other; the semiconductor bridge of (2), the semiconductor bridge being in contact with an ignition compound provided in the cup body, the semiconductor bridge being electrically connected to the electrode pins, the semiconductor bridge being ignited by being supplied with a current from outside through the plurality of electrode pins; a base provided integrally with a pair of electrode pins among the plurality of electrode pins, the pair of electrode pins being electrically parallel to the semiconductor bridge, the base being disposed outside the cup body and between the pair of electrode pins, the base having high rigidity to maintain a distance between the pair of electrode pins; and a capacitor positioned on the base and electrically connected to the pair of electrode pins.

(11) The igniter of the present invention includes a cup body; a plurality of electrode pins; a header with which an opening of the cup body is covered, the header holding the plurality of electrode pins insulated from each other; the semiconductor bridge of (2), the semiconductor bridge being in contact with an ignition compound provided in the cup body, the semiconductor bridge being electrically connected to the electrode pins, the semiconductor bridge being ignited by being supplied with a current from outside through the plurality of electrode pins; a flexible base disposed outside the cup body and between a pair of electrode pins among the plurality of electrode pins, the pair of electrode pins being electrically parallel to the semiconductor bridge; and a capacitor positioned on the base and electrically connected to the pair of electrode pins.

(12) The gas generator of the present invention includes the igniter mentioned in any one of (9) to (11).

Effects of the Invention

According to the semiconductor bridge and the igniter of (1) to (7), the ignition time can be shortened, and hence the demand for high-speed ignition of a gas generator, such as a side inflator, can be satisfied. Additionally, since the ignition time can be shortened, the energizing time can be shortened. Therefore, the amount of energy to be saved in an electronic control unit (ECU) used for an air bag can be reduced, and hence an energizing capacitor used for ignition can be made small. Additionally, according to the gas generator of (8), an air bag can be inflated in a short time, and it is suitable especially for a side inflator.

According to the structure of (10) and (11), in the igniter formed by pressing an ignition compound so as to be brought into contact with the bridge part in the cup body, the capacitor can be prevented from being destroyed by the pressing force.

According to the structure of (10), when the capacitor is set by use of a rigid base, the connection shut-off or breakdown of the capacitor caused by a change in distance between the electrode pins can be effectively prevented even if an external force is exerted between the electrode pins.

According to the structure of (11), since the capacitor is set by use of a flexible base, the connection shut-off or breakdown of the capacitor caused by easily following a change in distance between the electrode pins can be effectively prevented even if an external force is exerted between the electrode pins.

According to the structure of (12), the gas generator can be prevented from being wrongly operated by a static discharge caused by electromagnetic noise.

The present invention will be hereinafter described in more detail with reference to the attached drawings.

BEST MODE FOR CARRYING OUT THE INVENTION

FIG. 1(a) is a plan view of a semiconductor bridge 1 of the present invention, FIG. 1(b) is a sectional view along line A-A' of FIG. 1(a), and FIG. 1(c) is a sectional view along line B-B' of FIG. 1(a).

FIG. 2 is a sectional view of a conventional semiconductor bridge.

FIG. 3 is a sectional view showing an example of an igniter using the semiconductor bridge of the present invention.

FIG. 4 is a sectional view showing another example of the igniter using the semiconductor bridge of the present invention.

A structure of the semiconductor bridge 1 in relation to a method of producing the semiconductor bridge 1 will be hereinafter described with reference to FIG. 1(a), FIG. 1(b), and FIG. 1(c).

As shown in FIG. 1(b) and FIG. 1(c), the semiconductor bridge 1 includes a first layer 24 that is insulated and that has a substantially H-shaped plane identical in shape to a second layer 22 described later, the second layer 22 that is formed on the first layer 24 and that is made of a resistive material, electrode pads 34 separated from each other so as not to electrically bring about a direct current passage between the left side and the right side of the sheet in FIG. 1(a), and a bridge part 36 ignited by passing an electric current between the electrode pads 34. The first layer 24, the second layer 22, and the electrode pads 34 are disposed on an oxide film 12 of a silicon substrate 10 consisting of a silicon part 11 and the oxide film 12. The bridge part 36 is disposed at the center of the semiconductor bridge 1. The bridge part 36 is a part of a layered body formed by the first and second layers 24 and 22, and is structured so that the width of the bridge part at the first layer 24 and the width of the bridge part at the second layer 22 become equal to each other in the part of the layered body forming the bridge part 36 as shown in FIG. 1(c). The bridge part 36 has its side face and upper face both of which are exposed outwardly as shown in FIG. 1(c).

In contrast, the conventional semiconductor bridge of FIG. 2 includes an oxide film 12 formed on a silicon part 11, an ignition bridge layer 26 that is formed on the oxide film 12 and that has a substantially H-shaped plane (not shown), and electrode pads 34 separated from each other so as not to electrically bring about a direct current passage between the left side and the right side of the sheet in FIG. 2. The conventional semiconductor bridge additionally includes a bridge part (not shown) that is ignited by passing an electric current between the electrode pads 34, that has the same shape as the bridge part of FIG. 1(a), and that is disposed at the center of the conventional semiconductor bridge. This bridge part is a part of the ignition bridge layer 26.

Therefore, it is understood that the semiconductor bridge 1 according to this embodiment differs from the conventional semiconductor bridge of FIG. 2 in the fact that the first layer 24 is disposed between the oxide film 12 and the second layer 22.

A description will be given of a structure of the semiconductor bridge 1 and a method of producing the semiconductor bridge 1. Patterning is applied onto a silicon substrate by use of a photoresist so as to pattern the silicon substrate with the shape of the semiconductor bridge. For example, the surface of the oxide film 12 exposed outwardly is cleaned by an etching technique using Ar ions by an ECR discharge, and then the first layer 24 and the second layer 22 are piled on the oxide film 12. Herein, for example, a vacuum evaporation method or a sputtering method is suitable as a film forming method. After the first and second layers are piled thereon, the photoresist formed thereon by patterning is peeled off, and, as a result, an evaporation film subjected to patterning is left on the substrate.

For example, a material containing $SiO_2$, $TiO_2$, $Si_3N_4$, $Al_2O_3$, or AlN can be mentioned as the material of the first layer 24. Preferably, a material containing $SiO_2$ is used, because $SiO_2$ has high adhesive properties with respect to the oxide film 12 in the silicon substrate 10 and has a low thermal conductivity. The thickness of the first layer is about 0.02 microns to 3 microns, preferably 0.2 microns to 2 microns. The thickness of these microns can make production costs low, can bring about efficient insulation, and can quicken ignition time. Additionally, the first layer 24 has a thermal conductivity of 100 W/m·K or less in room temperature, preferably 70 W/m·K or less, more preferably 50 W/m·K or less. Additionally, the first layer 24 has an electrical resistivity of $10^2$ Ω·m or more, preferably $10^4$ Ω·m or more, more preferably $10^6$ Ω·m or more.

For example, a material containing Au, Al, Ag, Bi, C, Co, Cr, Cu, Fe, Ge, Hf, In, Ir, Mg, Mo, Nb, Ni, NiCr, Pb, Pt, n-type Si, p-type Si, Sn, Ta, TaN, Ti, V, W, Zn, or Zr (note that these may contain unavoidable impurities) can be mentioned as the material of the second layer 22. Preferably, a material containing Ni and Cr (i.e., Ni—Cr) is used as the material of the bridge part of the semiconductor bridge of the present invention, because a Ni—Cr material has a stable resistance temperature coefficient, and has given satisfactory results as a reliable material used in a bridge wire. Preferably, if a Ni—Cr film is formed as the second layer, the composition ratio between Ni and Cr forming the layer is 8:2. The thickness of the second layer 22 is about 0.02 microns to 3 microns, preferably 0.2 microns to 2 microns. This thickness of the second layer makes it possible to generate an amount of heat necessary to ignite an ignition compound when a current is passed therethrough, and prevents the generation of an amount of heat necessary to ignite an ignition compound by means of a diagnostic current used for a diagnosis of, for example, a failure of an igniter when ignition is not expected.

The term "unavoidable impurities" mentioned above denotes impurities that are unavoidably mixed without intention in each manufacturing process, e.g., when a target for film formation is made, when a substrate is made, or when a semiconductor bridge is made.

Next, to make the electrode pads 34 necessary to create a current passage between the electrode pin and the semiconductor bridge, a photoresist is applied onto the electrode part 35 by patterning, thereafter the part subjected to patterning is cleaned by, for example, an etching technique using Ar ions by the ECR discharge, and an electrically conductive material is deposited thereon. Finally, the photoresist subjected to patterning is peeled off, and, as a result, the electrode pad 34 is formed on the electrode part 35 of the second layer. For example, Al is used as the material of the electrode pad 34.

If a metal, such as Ni—Cr, is used for the second layer 22, adhesion between the second layer 22 and the oxide film 12 is weak especially when the oxide film 12 is formed on the surface of the silicon substrate 10. However, advantageously, an adhesive force with respect to the silicon substrate 10 is heightened by forming a $SiO_2$ film, which is the same in kind as the oxide film 12, on the oxide film 12 and by forming a Ni—Cr film in a vacuum state.

An igniter on which a semiconductor bridge is mounted will be described. The igniter is made up of a header on which a semiconductor bridge is chiefly mounted, electrode pins penetrating the header, and a cup body in which an ignition compound is loaded and by which the header is sealed. FIG. 3 is a sectional view of the igniter 100 according to an embodiment of the present invention. Herein, the semiconductor bridge 1 mentioned above is used. The semiconductor bridge 1 is mounted on the header 110 made of ceramic or an alloy by use of a non-conductive epoxy resin. The electrode pad 34 (not shown) of the semiconductor bridge and the electrode pins 130 penetrating the header 110 are electrically connected together by wirebonds or bonding wires 120. The cup body 141 is filled with an ignition compound 150, and the header 110 is fitted into the cup body 141. The thus structured cup body 141 is sealed by seal welding. An appropriate insulating material 170 is disposed between the electrode pins 130 and the header 110. Preferably, glass is used as the insulating material 170. The igniter 100 additionally has a resin mold 180 with which the lower part of a protective cover 140 of the cup body 141 and the lower part of the cup body 141 are covered.

Stainless steel (SUS) or aluminum can be mentioned as the material of the cup body 141. Plastics, such as nylon, can be mentioned as the material of the protective cover 140 of the cup body. The protective cover 140 of the cup body is to ensure insulation between the electrode pin 130 and, for example, a housing 204 of a gas generator 201, and is to shut off a stray current. The protective cover 140 can be removed.

To eliminate a mistaken fire against a noise such as static electricity, a capacitor, a Zener diode, or a varistor may be disposed in parallel with the semiconductor bridge.

A compound containing zirconium serving as a constituent element is suitable as the ignition compound 150. Besides, a compound containing hydrogenated titanium, boron, or tricinate is advantageously used as the ignition compound 150. Additionally, although the ignition compound shown in Japanese Published Unexamined Patent Application No. 2002-362992 can be used, the present invention is not limited to these. The ignition compound 150 may be composed of different kinds of substances forming two or more layers. For example, output can be adjusted by using different kinds of ignitable substances each of which makes each layer. A two-layer structure can be mentioned as one example. In this two-layer structure, an ignitable substance having excellent sensitivity, that means easily ignited even at a low temperature, is used for a layer being in contact with the semiconductor bridge, whereas an ignitable substance having insufficient sensitivity and having great output, i.e., having a large amount of gas, is used for the other layer.

Next, a description will be given of the operation and the effect of the ignition of the igniter 100. A current supplied to operate the igniter 100 passes through the electrode pin 130, and is then sent from the wirebond 120 to the bridge part 36 via the electrode pad 34 of the semiconductor bridge 1, thus heating the bridge part 36. The second layer 22 is subjected to ohmic heating until the second layer 22 is sufficiently heated. Heat generated in the second layer is used for heating without being radiated to the silicon substrate 10 by means of the first layer 24. Accordingly, heating is performed in the bridge part 36, and the ignition compound 150 disposed on the bridge part 36 can be ignited in the enclosure. Therefore, it is possible to provide the igniter 100 capable of restricting the diffusion of the current and the heat into the silicon substrate 10 to the minimum level and capable of obtaining the ignition characteristic of quickening an ignition time.

Next, a description will be given of an igniter according to another embodiment of the present invention. FIG. 4 is a sectional view of an igniter 1000 according to another embodiment of the present invention. A semiconductor bridge 1001 has the same structure as the semiconductor bridge 1 mentioned above, and is mounted on a header 1002 made of plastic or cured resin by use of a non-conductive epoxy resin. An electrode pad (not shown) of the semiconductor bridge and electrode pins 1003 penetrating the header 1002 are electrically connected together by wirebonds 1004. The cup body 1005 is loaded with an ignition compound 1006 with which the semiconductor bridge 1001, a part of the upper surface of the header 1002, and the head of the electrode pin 1003 are covered, and is further loaded with an ignition compound 1007 with which the ignition compound 1006 is covered and which is packed in the cup body 1005.

To eliminate a mistaken fire against a noise such as static electricity, a capacitor, a Zener diode, or a varistor may be disposed in parallel with the semiconductor bridge.

The same ignition compound as the ignition compound 150 mentioned above can be used as the ignition compounds 1006 and 1007.

Next, a description will be given of the operation and the effect of the ignition of the igniter 1000. A current supplied to operate the igniter 1000 passes through the electrode pin 1003, and is then sent from the wirebond 1004 to the bridge part (not shown) via the electrode pad (not shown) of the semiconductor bridge 1001, thus heating the bridge part. The second layer (not shown) is subjected to ohmic heating until the second layer is sufficiently heated. Heat generated in the second layer is used for heating without being radiated to the silicon substrate (not shown) by means of the first layer (not shown). Accordingly, heating is performed in the bridge part, and the ignition compound 1006 disposed on the bridge part can be ignited, and then the ignition compound 1007 can be ignited in the enclosure. Therefore, it is possible to provide the igniter 1000 capable of restricting the diffusion of the current and the heat into the silicon substrate in the semiconductor bridge 1001 to the minimum level and capable of obtaining the ignition characteristic of quickening an ignition time.

The gas generator of the present invention is suitably used as a micro-gas generator or an inflator, especially as a gas generator for an automotive side inflator prepared for a side collision.

Here, an example of the gas generator for the automotive side inflator will be described. FIG. 5 is a sectional view showing an example of a gas generator according to an embodiment of the present invention. A description of parts each of which has the same structure as in the above embodiments is appropriately omitted.

In FIG. 5, the gas generator 201 includes a cylindrical housing 204, a first partitioning member 209 by which the inside of the housing 204 is partitioned into a combustion chamber 206 filled with a gas generating agent 205 that generates a high temperature gas by combustion and a filter chamber 208 provided with a filter material 207, and an igniter 210 by which the gas generating agent 205 in the combustion chamber 206 is ignited and burned. The igniter 210 has the same structure as the igniter 100. The housing 204 has the shape of a bottomed cylinder formed so that an end 203 is opened and so that the other end 202 is closed. The other end 202 may be formed in a planar shape.

A gas emitting hole 211 is formed in the outer periphery of the other end 202 of the housing 204. Preferably, the gas emitting hole 211 is formed in a position in which an impellent force is not generated in the inflator when gas is emitted, e.g., is formed in a cylindrical part 220 of the filter chamber 208. Additionally, the gas emitting hole 211 may be provided not as a single hole but as a plurality of holes, may be provided not as a single row of holes but as a plurality of rows of holes in the axial direction, and may be provided in a zigzag manner if a plurality of rows of gas emitting holes are provided in the axial direction. Preferably, four or eight gas emitting holes are formed, and, more preferably, four gas emitting holes are formed in the same outer periphery at intervals of an angle of 90 degrees, or eight gas emitting holes are formed in the outer periphery in two rows in the axial direction at intervals of an angle of 90 degrees. A high-temperature and high-pressure gas generated by the combustion of the gas generating agent 205 in the combustion chamber 206 is cooled and filtered while passing through the filter material 207 provided in the filter chamber 208, and is emitted from the gas emitting holes 211.

The first partitioning member 209 is formed in a flat, annular disk shape with a hole 218, and has a two-chamber structure formed by being partitioned into the filter chamber 208 and the combustion chamber 206 as a gas-generating-agent chamber, thereby preventing the filter from being damaged or melt by combustion heat of the gas generating agent. The first partitioning member 209 is made of, for example, stainless steel or iron.

A seal member 216, such as an aluminum tape, is affixed at either or both of a positions at which the gas emitting holes 211 are covered on the inner face of the housing 204 and a position at which the hole 218 of the first partitioning member 209 is covered. As a result, the inside of the housing 204 is sealed up. More preferably, the seal member 216 is affixed onto the surface facing the combustion-chamber of the first partitioning member 209, and is not affixed onto the inner face of the housing 204. The affixing thereof onto the first partitioning member 209 can be easily performed, and can bring about a decrease in the manufacturing cost of the gas generator.

A holder 212 that holds the igniter 210 is provided at the end 203 of the housing 204. The holder 212 is held by being caulked together with a shaft end 213 of the housing 204, thereby closing the end 203 of the housing 204.

Preferably, caulking is performed in a direction in which the circumferential surface of the housing 204 near the position at which the first partitioning member 209 is disposed is reduced in diameter, and the end face of the outer periphery of the first partitioning member 209 is bit into the inner circumferential surface of the housing 204.

The filter material 207, the gas generating agent 205, an enhancing agent 214, and a cushion material 215 are loaded in this order from the other end 202 of the housing 204, into which the holder 212 to which the igniter 210 is caulked and fixed is fitted. The first partitioning member 209 can be disposed between the filter material 207 and the gas generating agent 205 if necessary.

A material having preferably a round shape, more preferably a columnar or cylindrical shape, especially preferably a cylindrical shape by, for example, a stockinet wire net, a plain weave wire net, or a group of crimped weave metal wires is used as the filter material 207. In this embodiment, a cylindrical material having the other end 202 formed in a round shape is shown. The filter material 207 is brought into contact with the tip of the other end 202 of the housing 204, and is attached thereto. The filter material 207 is fixed while being pressed against the other end 202 of the housing 204 by means of the first partitioning member 209 made of, for example, metal that partitions the inside of the housing 204. The first partitioning member 209 is fixed inside the housing 204 by being caulked from outer circumferential parts of the housing 204 that are located on both sides of the first partitioning member 209, thus partitioning the inside of the housing 204 into the filter chamber 208 and the combustion chamber 206. A space 219 is formed at the center in the longitudinal direction of the filter material 207 in such a way as to cut out the core of the filter material 207. A comparatively large amount of ignitable material, such as the gas generating agent 205, is used in the gas generator of the present invention that is suitably used to inflate, for example, a side air bag. Therefore, preferably, the first partitioning member 209 is used, thereby making it possible to partition the inside into the filter chamber 208 and the combustion chamber 206 and to prevent the filter from being damaged by combustion heat of the gas generating agent 205.

The combustion chamber 206 is filled with the enhancing agent 214. The enhancing agent 214 is protected by the cushion material 215 so as not to be powdered by vibrations. The cushion material 215 has a cross-shaped cut that is used to reliably transmit the power of flames from the igniter 210 to the enhancing agent 214 without delay. Preferably, the cushion material 215 is formed by using an elastic material, such as ceramic fiber or silicon rubber or silicon foam made from foamed silicon. Preferably, the cushion material 215 is usually formed in a disk shape having a one-layer structure.

Preferably, the gas generating agent 205 and the enhancing agent 214 are isolated from each other by means of a second partitioning member 246 formed in a plate shape, and are packed in the combustion chamber 206. Herein, the container normally denotes an iron-made or aluminum-made container into which an enhancer or the like is put. For example, a thin plate, a wire net, an expanded metal, or a punching metal can be mentioned as the second partitioning member 246.

Since the gas generating agent 205 and the enhancing agent 214 are isolated from each other by means of the second partitioning member 246, and are packed in the combustion chamber 206, these agents are not mixed together. Additionally, since the gas generating agent 205 and the enhancing agent 214 depending on a packed status of the gas generating agent 205 are close to each other with the thin second partitioning member 246 disposed between the gas generating agent 205 and the enhancing agent 214, a distance therebetween is never dispersed, and hence the performance of the gas generator 201 can be stabilized. The thin plate used as the second partitioning member 246 is made of any one of aluminum, iron, SUS, etc.

Additionally, preferably, the enhancing agent 214 is formed of columnar pieces, and hence when the enhancing agent 214 is packed, it is more difficult to enter a gap between the pieces of the gas generating agent 205 than powdery pieces or granular pieces. Therefore, even when these agents are being carried or after these agents are installed in, for example, an automotive, these can be prevented from being mixed together in the combustion chamber 206. Therefore, the performance of the gas generator can be stabilized more reliably.

Next, the operation of the gas generator 201 will be described. A crash sensor detects an automobile collision, and then an ECU (not shown) that has received a detection signal sends this signal to the igniter 210 disposed in the gas generator 201, and ignition is performed. Flames of the igniter 210 explode the cushion material 215, and make a hole therein. Thereafter, the flames burst into the combustion chamber 206, and ignite the enhancing agent 214. Accordingly, the gas generating agent 205 is forcibly ignited and burned, and, as a result, a high temperature gas is generated. The ignition and combustion of the gas generating agent 205 are sequentially shifted from the end 203 of the housing 204 toward the filter material 207.

When the internal pressure of the combustion chamber 206 rises to a predetermined internal pressure correspondingly with the progress of combustion in the combustion chamber 206, the high temperature gas generated therein breaks the seal member 216, then passes through the hole 218, then enters the space 219, then passes through the filter material 207, then undergoes slag trapping and cooling here, and is turned into a clean gas. This clean gas is emitted from the gas emitting hole 211.

As a result, an air belt or an air bag is instantaneously inflated.

As described above, in the gas generator 201 according to the embodiment of the present invention, the igniter 210 is provided with the same thin film bridge as the igniter 100, and hence can be reliably ignited more quickly than the conventional bridge wire type igniter.

Although the gas generator 201 that is commonly called a "pyro-inflator" and that includes the igniter 210 having the same structure as the igniter 100 has been shown in this embodiment, the igniter 100 or the igniter 1000 of the present invention may be used for an igniter part of a gas generator that is commonly called a "hybrid-inflator" shown in, for example, Japanese Published Unexamined Patent Application No. 2005-249275.

As a modification of the above embodiments, a substrate made of glass or ceramic may be used instead of the silicon substrate 10.

Next, a description will be given of an embodiment of an igniter including a base 308 and a capacitor 309 between electrode pins. FIG. 6 is a sectional view showing an igniter according to this embodiment.

In FIG. 6, reference numeral 301 designates a cup body, and reference numeral 302 designates a protective cover for the cup body. The protective cover 302 is to ensure insulation between the electrode pin 306 and, for example, the housing 204 of the gas generator 201, and is to shut off a stray current. The protective cover 302 can be removed.

Reference numeral 303 designates an ignition compound. A compound containing zirconium serving as a constituent element is suitable as the ignition compound 303. Besides, a compound containing hydrogenated titanium, boron, or tricinate is advantageously used as the ignition compound 303.

Reference numeral 304 designates a semiconductor bridge serving as a heating element in the same way as the semiconductor bridge 1 mentioned above. Therefore, the semiconductor bridge 304 can give a higher speed responsiveness than the bridge wire, and can generate great sparks with low energy.

The bridge structure can also be formed by alternately stacking layers of compositions containing at least one element selected from each of a group of nickel-chrome, nickel, aluminum, magnesium, and zirconium and a group of calcium, manganese, silica dioxide, and silicon.

Reference numeral 305 designates a header. The electrode pin 306 for an electrical connection to the outside is fixed to the header 305 by a glass sealer 307. Since the electrode pin 306 is fixed by the glass sealer 307 in this way, electric insulation can be secured while maintaining high airtightness. The inside of the cup body is sealed up under high airtightness by uniting the header 305 and the cup body 301 together by means of, for example, laser welding.

The electrode pin 306 is connected to the semiconductor bridge 304 inside the igniter, and transmits a current supplied from the outside to the semiconductor bridge 304.

Reference numeral 308 designates a base, reference numeral 309 designates a capacitor disposed on the base 308, and reference numeral 310 designates a resin mold with which the bottom of the header 305 and the base 308 provided with the capacitor 309 are covered.

The base 308 and the capacitor 309 will be hereinafter described in detail. FIG. 7(a) to FIG. 7(h) are views showing a typical base shape, a wiring pattern, and a capacitor-setting state.

It is recommended that the base shaped as in FIG. 7(a) to FIG. 7(d) be either a highly rigid base or a flexible base, and the base shaped as in FIG. 7(e) to FIG. 7(h) be a flexible base.

FIG. 7(a) shows an example in which two through-holes 311 into which two electrode pins are respectively inserted are formed in a flat plate having a rectangular shape, and the capacitor 309 is disposed on a base 308-1 having its flat surface provided with conductive paths 312 each of which extends from the through-hole 311.

FIG. 7(b) shows an example in which two through-holes 311 into which two electrode pins are respectively inserted are likewise formed in a flat plate having a circular shape, and the capacitor 309 is disposed on a base 308-2 having its flat surface provided with conductive paths 312 each of which extends from the through-hole 311.

FIG. 7(c) shows an example in which two through-holes 311 into which two electrode pins are respectively inserted are formed in a thick block having a rectangular shape, and the capacitor 309 is attached to a base 308-3 provided with conductive paths 312 which are formed on the side surface of the block and each of which extends from the through-hole 311.

Preferably, the inner circumferential surface of the through-hole 311 is covered with a conductive material in each of FIG. 7(a), FIG. 7(b), and FIG. 7(c).

FIG. 7(d) shows an example in which the base has the same shape as in FIG. 7(a), and the capacitor 309 is disposed so that the direction of two poles of the capacitor 309 becomes substantially parallel to the direction in which the pair of electrode pins are connected together.

FIG. 7(e) shows an example in which the base is a divided-type base, and the capacitor 309 is stretched over and connected to both a divided base 308a and a divided base 308b extending in a direction substantially perpendicular to the direction connecting the pair of electrode pins together.

FIG. 7(f) shows an example in which the divided base is an L-shaped divided base, and the capacitor 309 is disposed between electrode pins so that the direction of two poles of the capacitor 309 becomes substantially perpendicular to the direction connecting the pair of electrode pins together.

FIG. 7(g) shows an example in which the structure closely resembles the structure of FIG. 7(f), and each of the divided bases 308a and 308b is formed in a half-arc shape.

FIG. 7(h) shows an example in which divided substrates are bent in a direction parallel to the electrode pin, and the capacitor is connected thereto.

The conductive paths 312 through which the electrode pins and the two poles of the capacitor 309 are connected together are formed in each of FIG. 7(a) and FIGS. 7(d) to 7(h).

This connection manner between the electrode pin and the capacitor can also be applied to the electrode pin of FIG. 4.

Such a highly rigid material as not to cause a change in distance between the electrode pins even if external pressure is applied thereonto can be used as the base in each of FIG. 7(a) to FIG. 7(d).

Ceramic is most suitable as such a material. Besides, an insulating base, such as a glass epoxy base or a plastic plate, can be advantageously used. Normally, this base is provided with wires to electrically connect the electrode pin and the capacitor together.

A highly flexible material capable of easily coping with a change in distance between the electrode pins that is caused when external pressure is applied thereonto even if such a change is caused can be used as the base in each of FIG. 7(a) to FIG. 7(h).

A lead frame or a flexible substrate is suitable as such a material. Besides, a lead wire or the like can be used.

Herein, the term "lead frame" denotes a thin plate metal used as an internal wiring part of a semiconductor package, and can serve as a mediator with respect to outer wiring parts, and can design the wiring of various patterns. The "flexible substrate" denotes a flexible printed board, and is effective for a variety of circuit designs because this can be bent. This is used to connect the electrode pin and the ceramic capacitor together in this embodiment of the present invention.

Preferably, when the capacitor 309 is set, the direction of the two poles of the capacitor 309 is fixed to be substantially perpendicular to the direction connecting the two electrode pins together as shown in FIG. 7(a), FIG. 7(b), FIG. 7(f), and FIG. 7(g).

The reason is as follows. For example, if the capacitor 309 is arranged so that the direction of the two poles of the capacitor 309 becomes substantially parallel to the direction connecting the two electrode pins together, there is a great danger that the capacitor will directly undergo stress resulting from a change in distance between the electrode pins, and hence will be destroyed. In contrast, if the capacitor 309 is arranged so that the direction of the two poles of the capacitor 309 becomes substantially perpendicular to the direction connecting the two electrode pins together, such a danger will not be caused.

In this embodiment, the term "substantially perpendicular" denotes the range of ±30° based on the direction exactly perpendicular to the direction connecting the two electrode pins together.

A case in which the number of the electrode pins is two has been described as above with reference to FIG. 6 and FIG. 7. However, this embodiment can be applied to an igniter having three or more electrode pins. Note that, if three or more electrode pins are provided, it is important to select two electrode pins that are electrically parallel to the semiconductor bridge from among the three or more electrode pins.

Additionally, preferably, the base provided with the capacitor arranged as above is covered with a resin mold.

The reason is that a shock, temperature, or humidity applied onto the capacitor can be effectively prevented, and the capacitor can be protected from force acting on a connection part of the capacitor and on a part between the electrode pins by embedding the capacitor in the resin mold.

Preferably, the equivalent series resistance that is a resistance value of the capacitor is set at 100 mΩ or less.

The reason is that static electricity can be effectively absorbed by the capacitor in proportion to a decrease in the resistance value. Concerning this respect, an aluminum electrolytic capacitor or a tantalum capacitor is high in the resistance value, and hence a certain quantity of current flows toward the semiconductor bridge, and it is difficult to effectively stop a static discharge.

Additionally, a ceramic capacitor is advantageously used as the capacitor.

The reason is that the ceramic capacitor is lower in a value, called an equivalent series resistance, of impedance with respect to frequency characteristics, and is superior in noise absorption characteristics to the aluminum electrolytic capacitor and the tantalum capacitor mentioned above.

The following capacitors can be mentioned as examples of such ceramic capacitors.

1. I-type ceramic capacitor ($TiO_2$): For temperature compensation
2. II-type ceramic capacitor ($BaTiO_3$-based or PbO-based): For high dielectric constant
3. III-type ceramic capacitor ($SrTiO_3$ semiconductor-based): For high dielectrics In this embodiment, any one of these capacitors is suitable, and it is recommended to appropriately use it depending on various uses.

Although these ceramic capacitors are extremely superior in performance, these have the drawback of being weak in stress in the axial direction. Therefore, when these ceramic capacitors are set, it is desirable to dispose these capacitors so that the direction of the two poles of the capacitor becomes substantially perpendicular to the direction connecting the two electrode pins together.

Preferably, the electrostatic capacity of the capacitor to be used is set at about 0.1 to 10 μF.

If the electrostatic capacity of the capacitor becomes great, time required for charging will become long, and a problem will arise concerning high-speed responsiveness. For example, if the electrostatic capacity of the capacitor is 0.47 μF, the responsiveness is 0.94 μsec, if the electrostatic capacity thereof is 2 μF, the responsiveness is 4 μsec, and if the electrostatic capacity thereof is 10 μF, the responsiveness is 20 μsec.

The reason why the semiconductor bridge is used as a heating element in this embodiment is that the semiconductor bridge is characterized by low energy and high-speed ignition. Therefore, if the electrostatic capacity of the capacitor is great, the high-speed responsiveness is hindered. Additionally, if the electrostatic capacity of the capacitor becomes great, the size of the capacitor becomes great correspondingly therewith, and it becomes difficult to dispose the capacitor between electrode pins.

A fixing means of the base with respect to the electrode pin is not limited to a specific one. Solder, electroconductive epoxy resin, welding, or contact using a spring is advantageously used as the fixing means.

EXAMPLE

A semiconductor bridge structured as shown in FIG. 1(b) was mounted on the igniter of FIG. 3, and ignition time was measured. As a comparative experiment, ignition time was measured by using an igniter provided with a semiconductor bridge in which the thickness of the oxide film disposed on the silicon substrate has been changed in the structure shown in FIG. 2. In this experiment, a semiconductor bridge was used in which a second layer composed of Ni and Cr (which was made according to the sputtering method using a Ni—Cr alloy whose ratio between Ni and Cr was 8:2) has a predetermined thickness of 1.5 microns. The width of the bridge part 36 was 24 microns, the length thereof was 58 microns, and the resistance value was approximately 2Ω. A constant current, which was supplied under the condition of 1.2 A and 2 msec, was used as an input current. Ignition time was measured under the condition that time from the rise waveform of the input current to the rise waveform of light caused when a fire is made by the igniter is defined as the "ignition time."

More specifically, Sample 1 to Sample 7 were made in each of which the thickness of the oxide film on the silicon substrate and the thickness of the first layer (SiO₂) were determined as shown in Table 1 and Table 2, and ignition time was measured. The thickness of the oxide film on the silicon substrate and the thickness of the first layer (SiO₂) in each sample were shown together with measurement results in Table 1 and Table 2.

TABLE 1

|  | Thickness of oxide film on silicon substrate (μm) | Thickness of first layer (SiO₂) (μm) | Ignition time (μsec) |
|---|---|---|---|
| Sample 1 | 0.8 | 0 | 180 |
| Sample 2 | 0.8 | 0.3 | 129 |
| Sample 3 | 0.8 | 0.5 | 99 |
| Sample 4 | 0.8 | 1.0 | 94 |

TABLE 2

|  | Thickness of oxide film on silicon substrate (μm) | Thickness of first layer (SiO₂) (μm) | Ignition time (μsec) |
|---|---|---|---|
| Sample 1 | 0.8 | 0 | 180 |
| Sample 5 | 1.1 | 0 | 167 |
| Sample 6 | 1.3 | 0 | 160 |
| Sample 7 | 1.8 | 0 | 157 |

As can be understood from Table 1 and Table 2, the ignition time was quickened by increasing the thickness of the oxide film disposed on the silicon substrate, and was able to be more quickened by using the first layer subjected to patterning so as to have the same shape as the second layer. Probably, the reason is that the diffusion of heat and current into the oxide film of the silicon substrate was restricted to the minimum level, so that thermal insulation and electrical insulation were effectively performed.

The present invention has been described with reference to the concrete examples. A person skilled in the art can carry out various modifications of the present invention without departing from the thought and scope of the present invention provided by the attached claims. For example, alternative materials and alternative structures fall within the scope of the claims.

Figure 1:
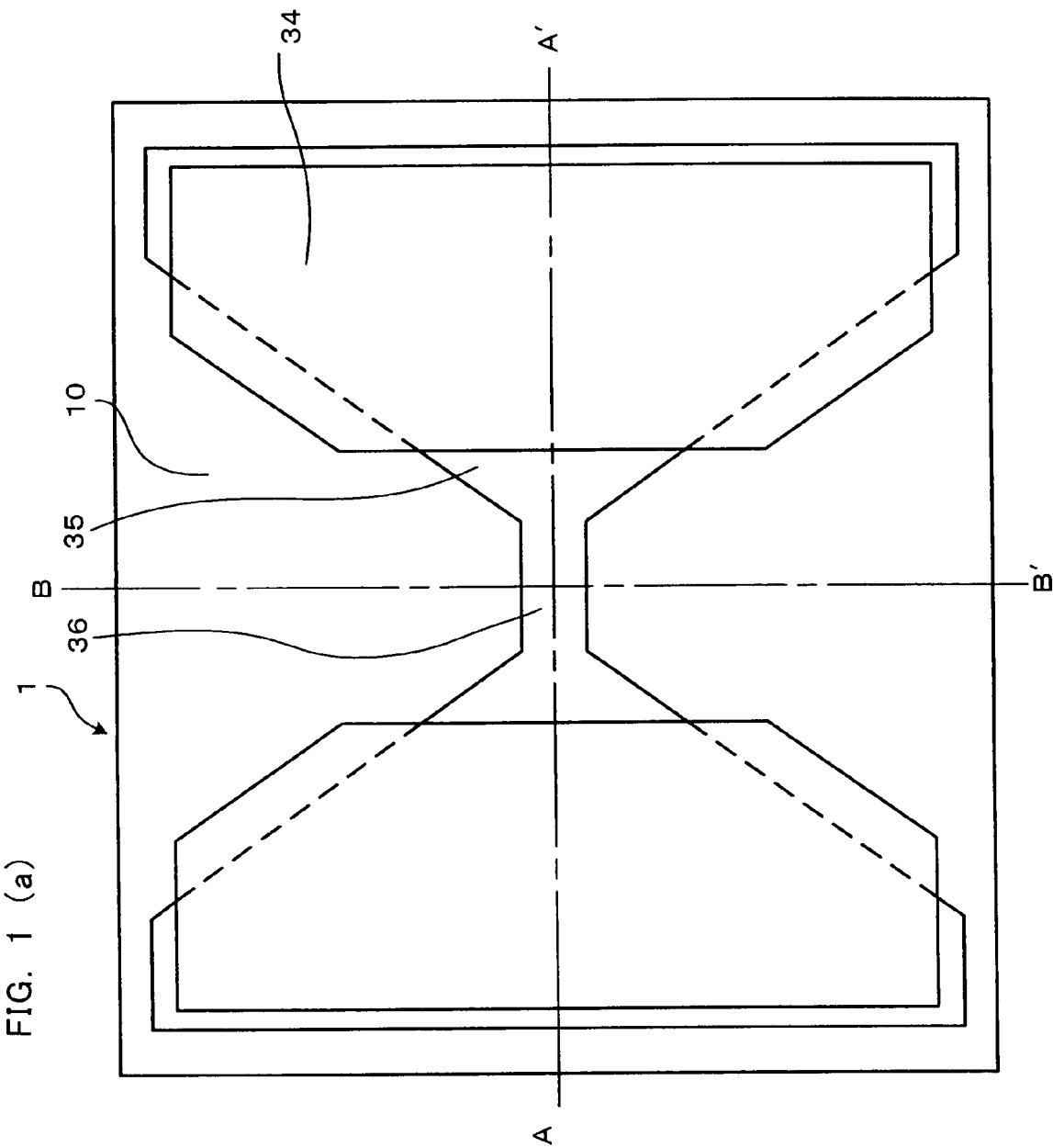
FIG. 1(a) is a plan view of a semiconductor bridge according to an embodiment of the present invention.
FIG. 1(b) is a sectional view along line A-A' of the semiconductor bridge of FIG. 1(a).
FIG. 1(c) is a sectional view along line B-B' of the semiconductor bridge of FIG. 1(a).
Figure 1:
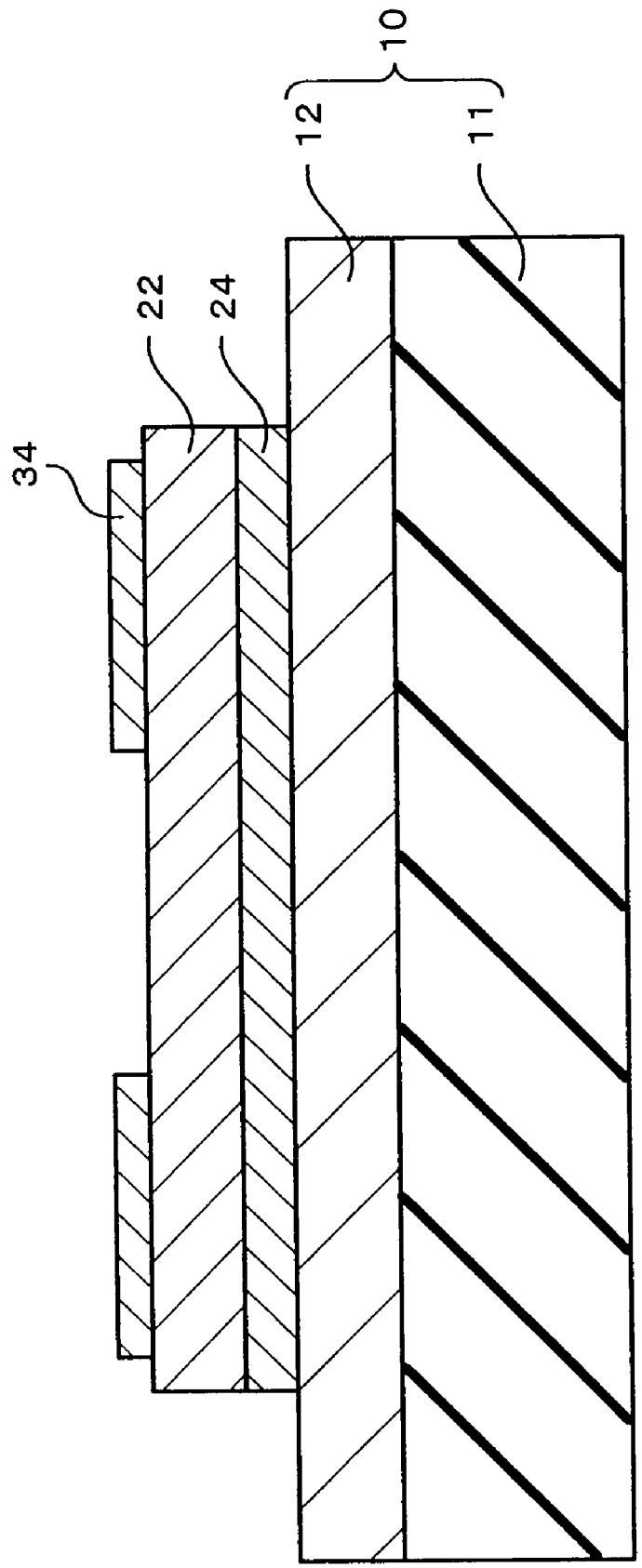
Figure 1:
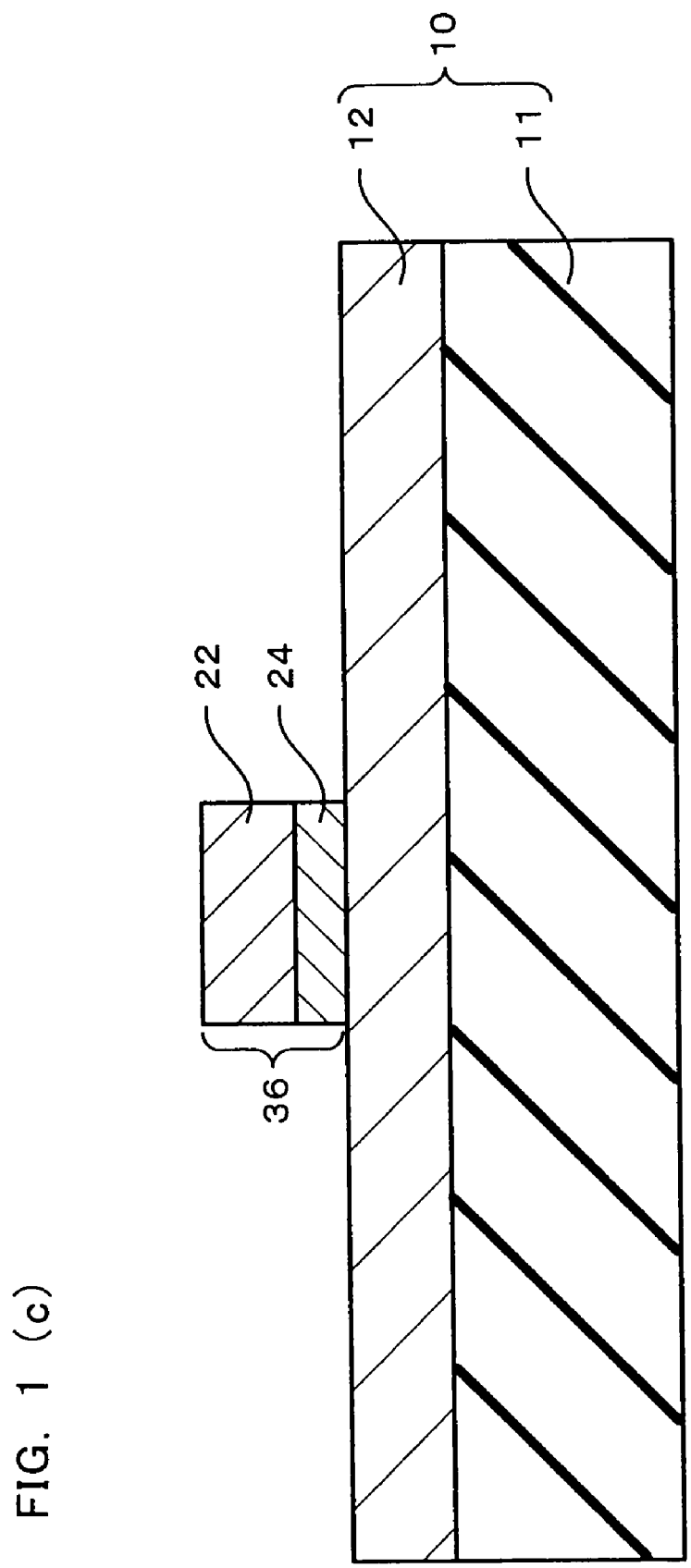
Figure 2:
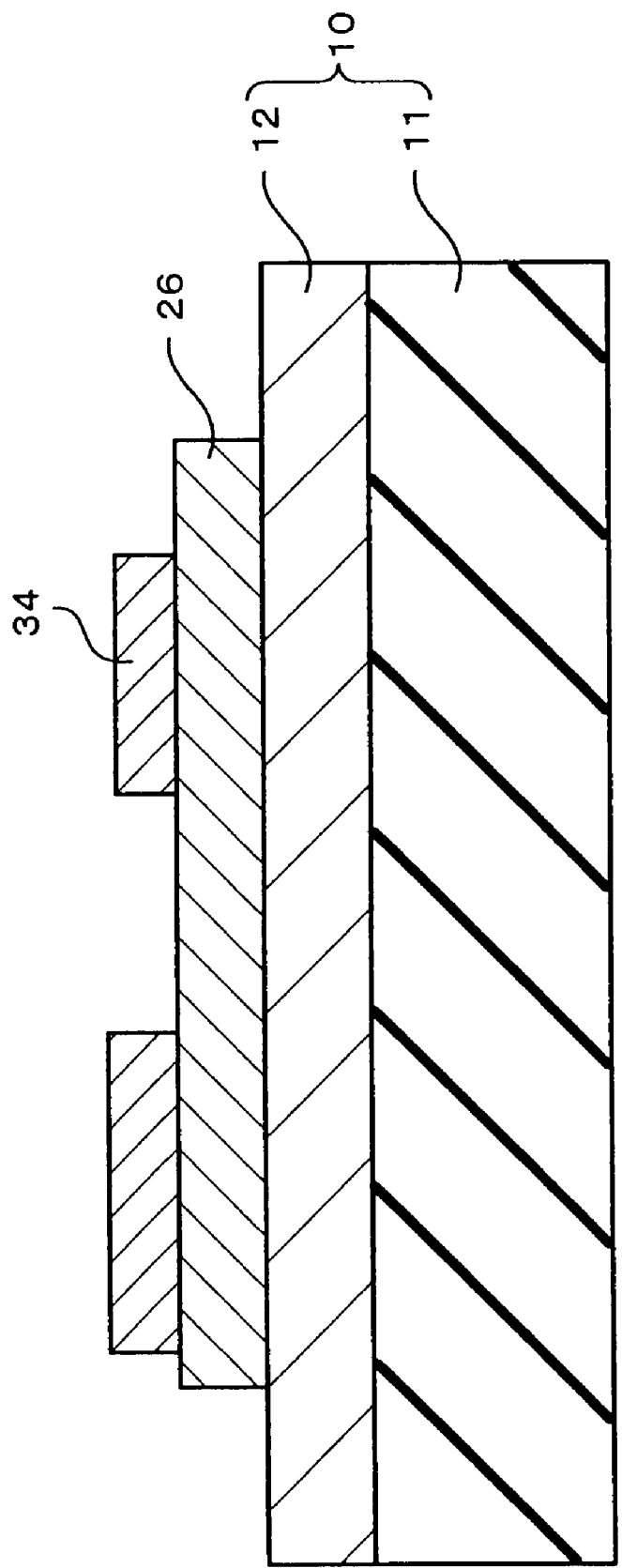
FIG. 2 is a sectional view of a conventional semiconductor bridge.
Figure 3:
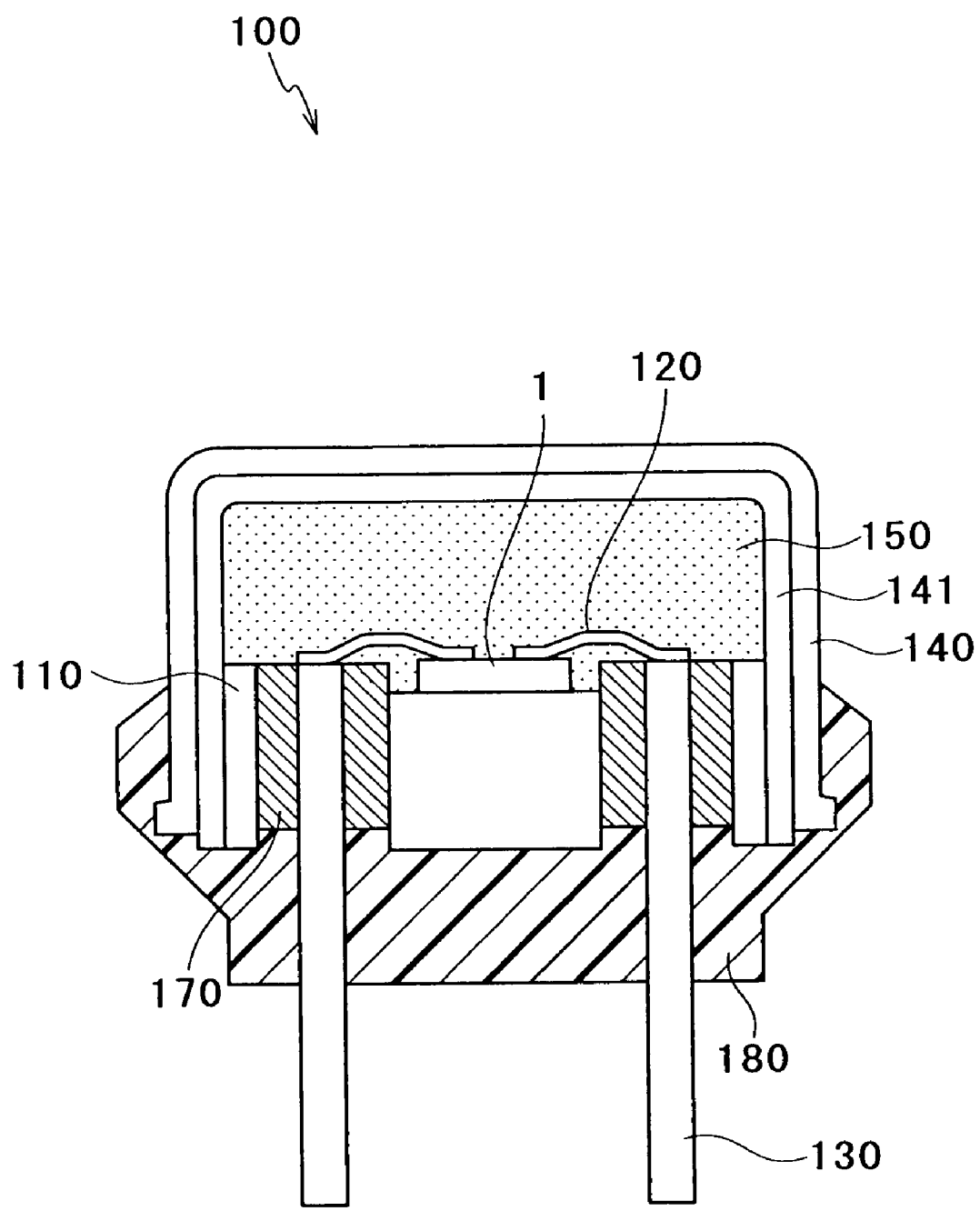
FIG. 3 is a sectional view of an igniter using the semiconductor bridge of FIG. 1(a).
Figure 4:
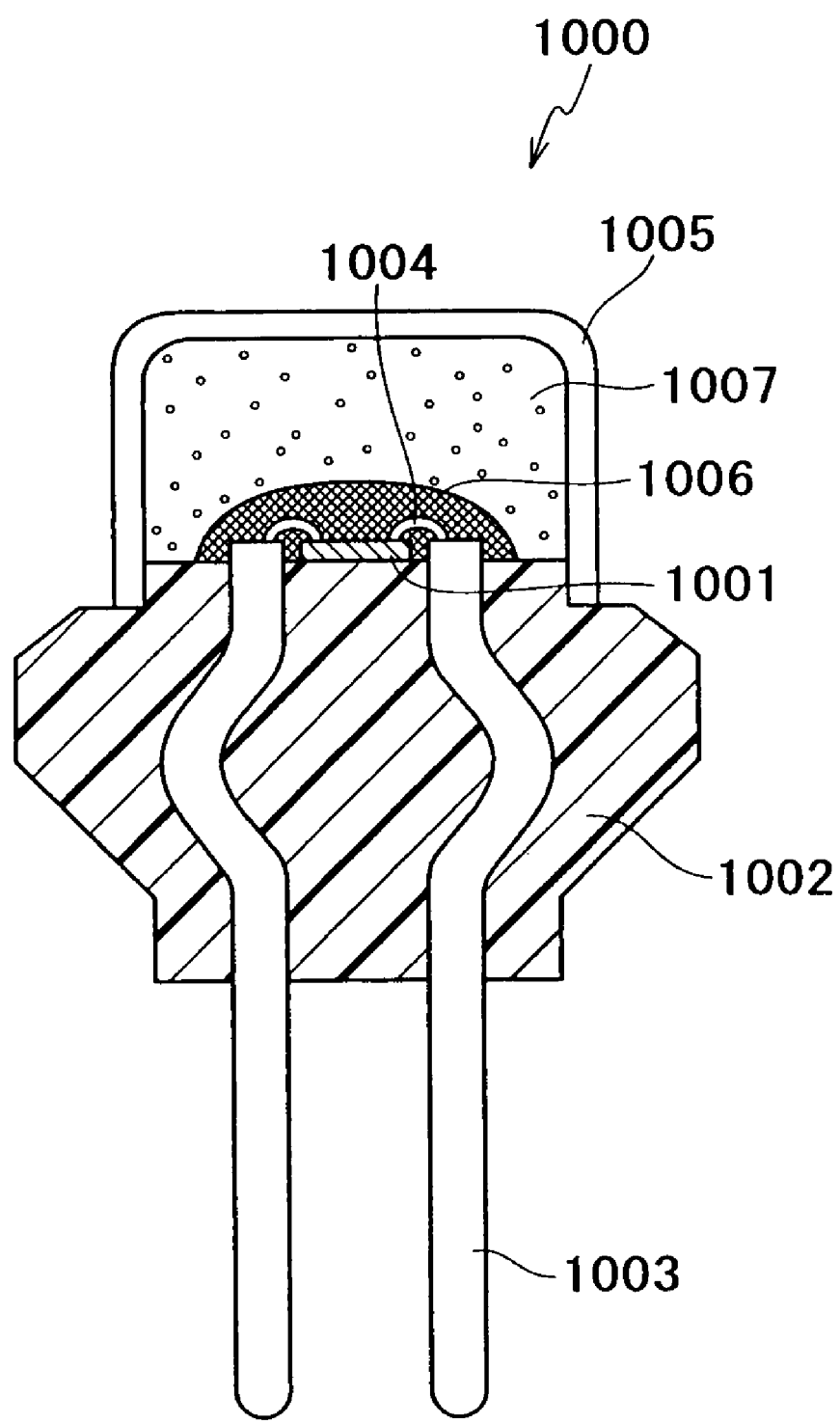
FIG. 4 is a sectional view of an igniter according to another embodiment of the igniter of FIG. 3.
Figure 5:
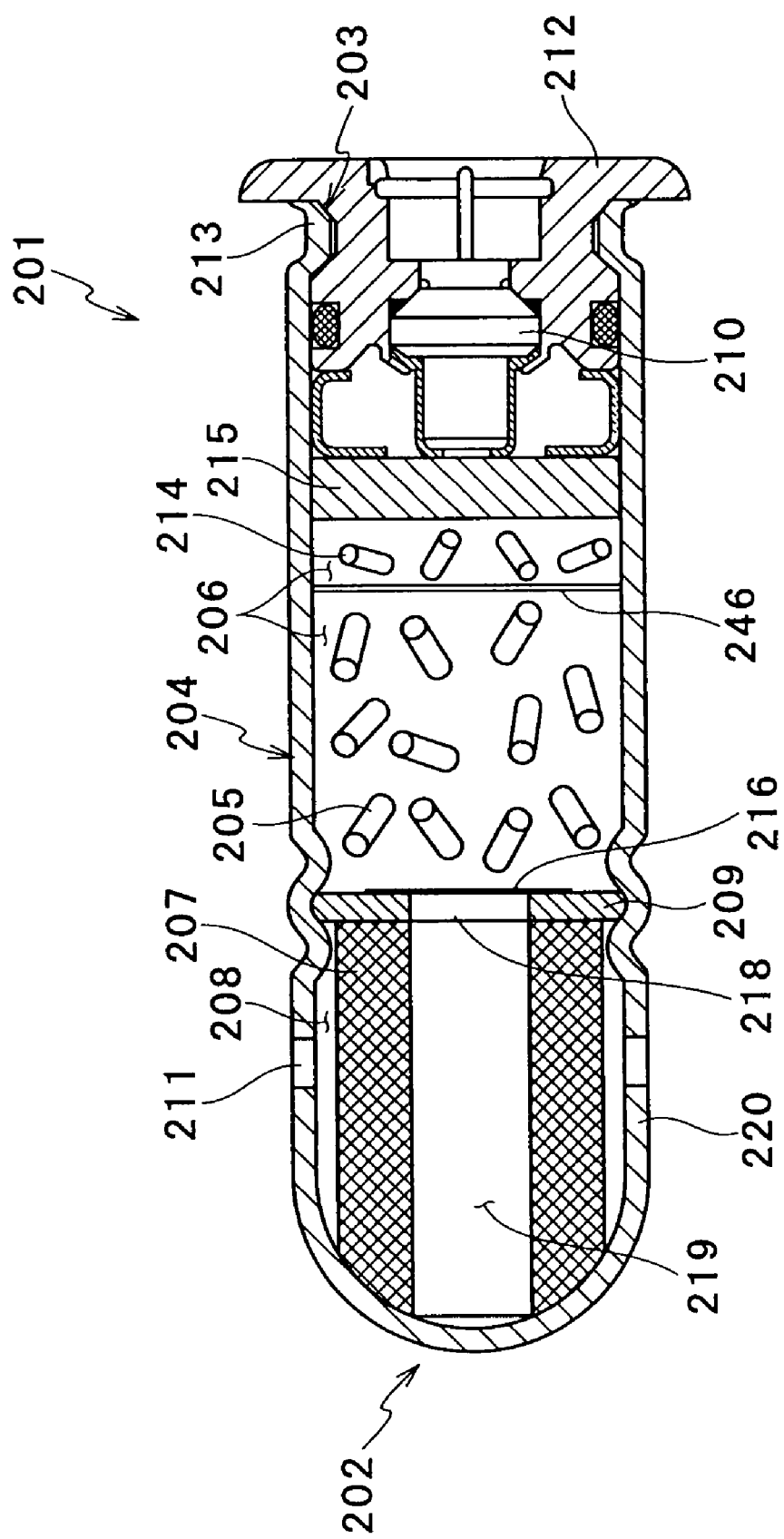
FIG. 5 is a sectional view of a gas generator according to an embodiment of the present invention.
Figure 6:
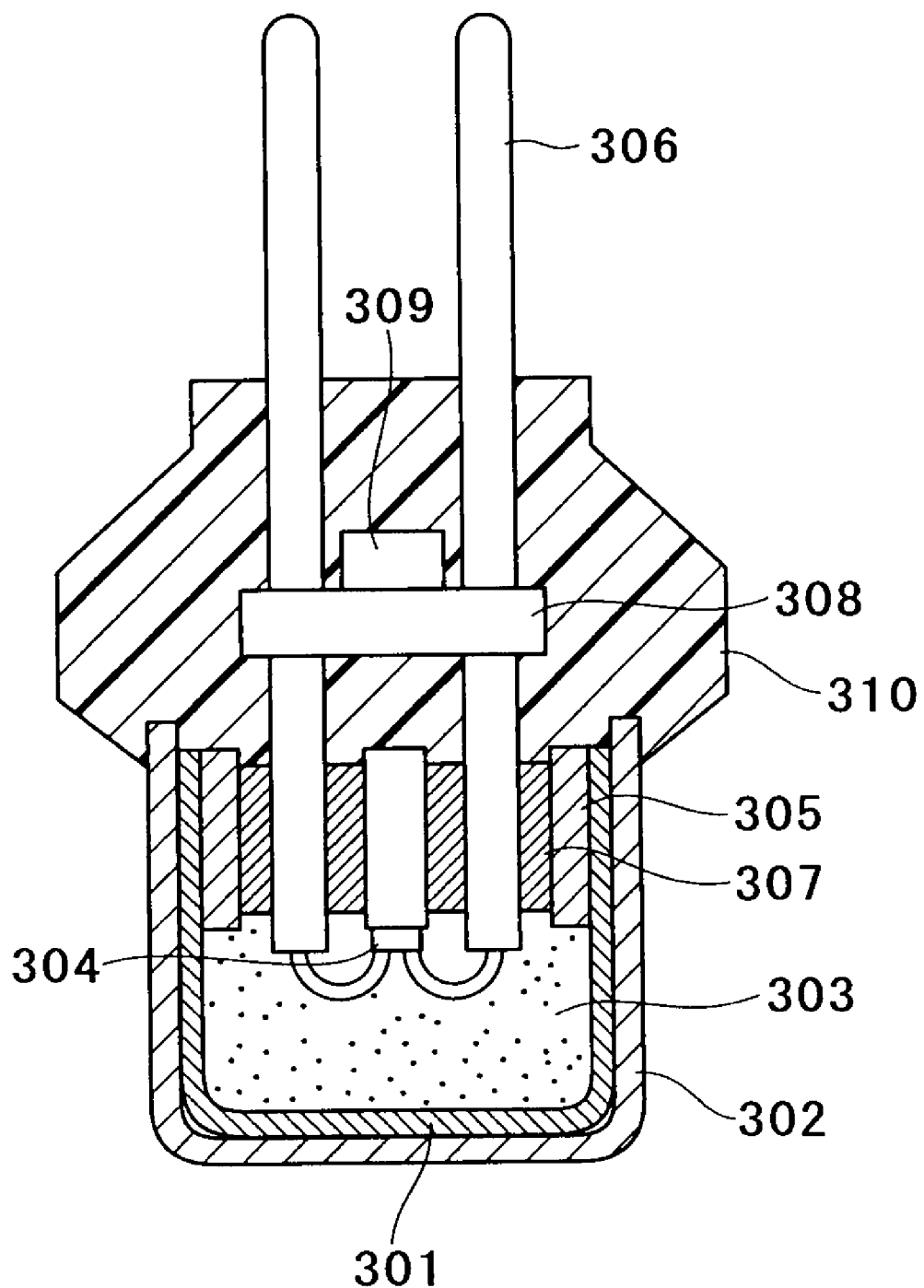
FIG. 6 is a sectional view of an igniter provided with a base and a capacitor between electrode pins.
Figure 7:
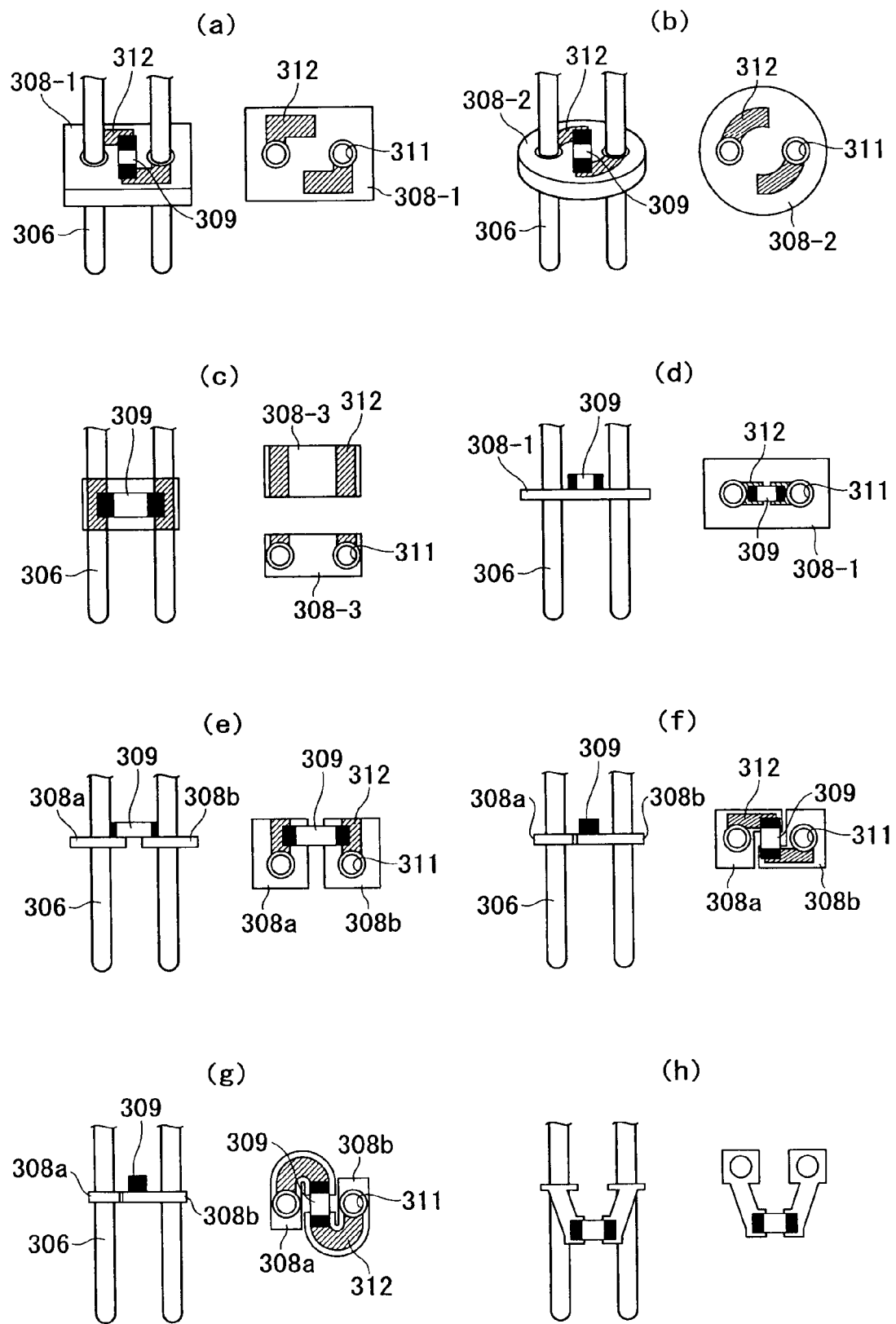
FIG. 7 shows a typical base shape in the igniter of FIG. 6, a wiring pattern, and a capacitor-setting state.

| Description of Reference Numerals | |
|---|---|
| 1, 304, 1001 | Semiconductor bridge |
| 10 | Silicon substrate |
| 11 | Silicon part |
| 12 | Oxide film |
| 22 | Second layer |
| 24 | First layer |
| 26 | Ignition bridge layer |
| 34 | Electrode pad |
| 35 | Electrode part |
| 36 | Bridge part |
| 100, 210, 1000 | Igniter |
| 110, 1002 | Header |
| 120, 1004 | Wirebond |
| 130, 306, 1003 | Electrode pin |
| 140, 302 | Protective cover of cup body |
| 141, 301, 1005 | Cup body |
| 150, 303, 1006, 1007 | Ignition compound |
| 170 | Insulating material |
| 180, 310 | Resin mold |
| 201 | Gas generator |
| 202 | Other end |
| 203 | End |
| 204 | Housing |
| 205 | Gas generating agent |
| 206 | Combustion chamber |
| 207 | Filter material |
| 208 | Filter chamber |
| 209 | First partitioning member |
| 211 | Gas emitting hole |
| 212 | Holder |
| 213 | Shaft end |
| 214 | Enhancing agent |
| 215 | Cushion material |
| 216 | Seal member |
| 218 | Hole |
| 219 | Space |
| 220 | Cylindrical part |
| 246 | Second partitioning member |
| 305 | Header |
| 307 | Glass sealer |
| 308 | Base |
| 309 | Capacitor |
| 311 | Through-hole |
| 312 | Conductive path |

The invention claimed is:

1. A semiconductor bridge comprising:
a bridge part disposed in contact with a substrate and having a narrowed section above the substrate,
the bridge part heated by applying a current along a crosswise direction through a narrowed section of the bridge part and formed on the substrate and above the substrate,
the narrowed section including a first layer and an ignition bridge layer,
the first layer being formed on the substrate, having insulating properties, and containing SiO₂,
the ignition bridge layer being formed on the first layer and serving as a second layer above the first layer and above the substrate;
wherein a width in a direction perpendicular to the crosswise direction of the bridge part at the first layer and a width in a direction perpendicular to the crosswise direction of the bridge part at the second layer are substantially equal to each other,
wherein a side face and an upper face of the bridge part are exposed outwardly,
wherein the first layer has a thermal conductivity of 50 W/m·K or less, an electrical resistivity of $10^6$ Ω·m or more in room temperature, and a thickness between 0.2 and 2.0 μm, and wherein the substrate is made of silicon, a surface of the substrate is provided with an oxide film, and the first layer is an oxide film of $SiO_2$.

2. The semiconductor bridge according to claim 1, wherein the bridge part has a two-layer structure.

3. The semiconductor bridge according to claim 1, wherein the second layer has a thickness of 0.02 microns to 3 microns.

4. The semiconductor bridge according to claim 1, wherein the second layer contains Ni and Cr.

5. An igniter including the semiconductor bridge of claim 1, the semiconductor bridge serving as an ignition element.

6. A gas generator including the igniter of claim 5.

7. An igniter comprising:
a cup body;
a plurality of electrode pins;
a header with which an opening of the cup body is covered, the header holding the plurality of electrode pins insulated from each other;
the semiconductor bridge of claim 1, the semiconductor bridge being in contact with an ignition compound provided in the cup body, the semiconductor bridge being electrically connected to the electrode pins, the semiconductor bridge being ignited by being supplied with a current from outside through the plurality of electrode pins; and
a capacitor electrically connected to a pair of electrode pins among the plurality of electrode pins at the outside of the cup body, the pair of electrode pins being electrically parallel to the semiconductor bridge.

8. An igniter comprising:
a cup body;
a plurality of electrode pins;
a header with which an opening of the cup body is covered, the header holding the plurality of electrode pins insulated from each other;
the semiconductor bridge of claim 1, the semiconductor bridge being in contact with an ignition compound provided in the cup body, the semiconductor bridge being electrically connected to the electrode pins, the semiconductor bridge being ignited by being supplied with a current from outside through the plurality of electrode pins;
a base provided integrally with a pair of electrode pins among the plurality of electrode pins, the pair of electrode pins being electrically parallel to the semiconductor bridge, the base being disposed outside the cup body and between the pair of electrode pins to maintain a distance between the pair of electrode pins; and
a capacitor positioned on the base and electrically connected to the pair of electrode pins.

9. An igniter comprising:
a cup body;
a plurality of electrode pins;
a header with which an opening of the cup body is covered, the header holding the plurality of electrode pins insulated from each other;
the semiconductor bridge of claim 1, the semiconductor bridge being in contact with an ignition compound provided in the cup body, the semiconductor bridge being electrically connected to the electrode pins, the semiconductor bridge being ignited by being supplied with a current from outside through the plurality of electrode pins;
a flexible base disposed outside the cup body and between a pair of electrode pins among the plurality of electrode pins, the pair of electrode pins being electrically parallel to the semiconductor bridge; and
a capacitor positioned on the base and electrically connected to the pair of electrode pins.

10. A gas generator including the igniter of any one of claims 7 to 9.

11. A semiconductor bridge comprising:
a bridge part disposed in contact with a substrate and having a narrowed section above the substrate,
the bridge part ignited by applying a current along a crosswise direction through a narrowed section of the bridge part above the substrate,
the narrowed section including a first layer formed on a substrate and a second layer formed on the first layer, above the first layer, and above the substrate;
said first layer having insulating properties and a thickness between 0.2 and 2.0 μm; and
said second layer being made of a resistive material to conduct said current in said narrowed section of the bridge part above the substrate,
wherein the first layer and the second layer have the same width in a direction perpendicular to the crosswise direction of the bridge part,
and
wherein the substrate is made of silicon, a surface of the substrate is provided with an oxide film, and the first layer is an oxide film of $SiO_2$.

* * * * *